US010092030B2

(12) United States Patent
Diaz et al.

(10) Patent No.: US 10,092,030 B2
(45) Date of Patent: Oct. 9, 2018

(54) METHOD FOR THE PRODUCTION OF EDIBLE OBJECTS USING SLS AND FOOD PRODUCTS

(71) Applicant: Nederlandse Organisatie voor toegepast-natuurwetenschappelijk onderzoek TNO, 's-Gravenhage (NL)

(72) Inventors: Jerome Villarama Diaz, 's-Gravenhage (NL); Kjeld Jacobus Cornelis van Bommel, 's-Gravenhage (NL); Martijn Willem-Jan Noort, 's-Gravenhage (NL); Jolanda Henket, 's-Gravenhage (NL); Peter Briër, 's-Gravenhage (NL)

(73) Assignee: NEDERLANDSE ORGANISATIE VOOR TOEGEPAST-NATUURWETENSCHAPPELIJK ONDERZOEK TNO TNO/IP & CONTRACTING (NL)

( * ) Notice: Subject to any disclaimer, the term of this patent is extended or adjusted under 35 U.S.C. 154(b) by 279 days.

(21) Appl. No.: 14/894,231

(22) PCT Filed: May 27, 2014

(86) PCT No.: PCT/NL2014/050335
§ 371 (c)(1),
(2) Date: Nov. 25, 2015

(87) PCT Pub. No.: WO2014/193226
PCT Pub. Date: Dec. 4, 2014

(65) Prior Publication Data
US 2016/0100621 A1  Apr. 14, 2016

(30) Foreign Application Priority Data
May 27, 2013  (EP) .................................... 13169327

(51) Int. Cl.
*A23P 10/00*  (2016.01)
*A23P 1/10*  (2006.01)
(Continued)

(52) U.S. Cl.
CPC ................. *A23P 1/10* (2013.01); *A21D 13/80* (2017.01); *A23P 10/00* (2016.08); *A23P 30/00* (2016.08);
(Continued)

(58) Field of Classification Search
CPC .......... A23P 10/00; A23P 30/00; A23P 30/10; A23P 2020/253; A21D 13/80; B41F 19/08; B33Y 10/00; B33Y 80/00
(Continued)

(56) References Cited

U.S. PATENT DOCUMENTS 2,739,896 A * 3/1956 Block .................... A21D 13/28
426/653
6,280,785 B1 * 8/2001 Yang .................... A21C 11/163
425/112

(Continued)

OTHER PUBLICATIONS www.upichem.com, Corn Starch NF; UPI chem, pp. 4; Year 2014. (Year: 2014).*

(Continued)

*Primary Examiner* — Jyoti Chawla
(74) *Attorney, Agent, or Firm* — Tarolli, Sundheim, Covell & Tummino LLP

(57) ABSTRACT

The present invention provides a method for the production of edible objects by selective laser sintering (SLS) using particular multi-material powder compositions. The edible compositions comprise a binder component having a melting or glass transition temperature in the range 10-200° C., and a structural component which is non-melting at the temperatures below 200° C. The composition is then sub- (Continued)

(a)

(b)

jected SLS to obtain a three-dimensional edible object. The invention can be used to produce food products using SLS, such as a bakery product, a dry mix for beverage, an instant soup or a confectionery product, among others.

16 Claims, 3 Drawing Sheets

(51) Int. Cl.
    *B29C 67/00*     (2017.01)
    *B41F 19/08*     (2006.01)
    *A23P 30/10*     (2016.01)
    *A23P 30/00*     (2016.01)
    *A21D 13/80*     (2017.01)
    *B33Y 10/00*     (2015.01)
    *B33Y 80/00*     (2015.01)
    *A23P 20/25*     (2016.01)

(52) U.S. Cl.
    CPC .......... *A23P 30/10* (2016.08); *B29C 67/0051* (2013.01); *B29C 67/0077* (2013.01); *B41F 19/08* (2013.01); *A23P 2020/253* (2016.08); *A23V 2002/00* (2013.01); *B33Y 10/00* (2014.12); *B33Y 80/00* (2014.12)

(58) Field of Classification Search
    USPC .......................................................... 426/89
    See application file for complete search history.

(56) References Cited

U.S. PATENT DOCUMENTS 7,807,077 B2    10/2010    Hochsmann et al.
2008/0260918 A1    10/2008    Lai et al.

OTHER PUBLICATIONS

Peng Liu et al., "Glass Transition Temperature of Starch Studied by a High-Speed DSC" Carbohydrate Polymers, vol. 77, 2009, pp. 250-253.
International Search Report to corresponding International patent application No. PCT/NL2014/050335, dated Sep. 19, 2014, 2 pages.

* cited by examiner (a)

(b)

METHOD FOR THE PRODUCTION OF EDIBLE OBJECTS USING SLS AND FOOD PRODUCTS

CROSS-REFERENCE TO RELATED APPLICATIONS

This application is the U.S. national phase entry of PCT/NL2014/050335, with an international filing date of May 27, 2014, which claims priority to and the benefit of EP 13169327.7, filed on May 27, 2013, the contents of which are hereby incorporated by reference in their entirety.

FIELD OF INVENTION

The invention relates to the field of additive manufacturing (AM, also known as rapid manufacturing, or 3D printing) of edible objects. Particularly, the present invention provides a method for the production of edible objects using selective laser sintering (SLS).

BACKGROUND OF THE INVENTION

The ability to print food with additive manufacturing is believed to potentially have a tremendous impact as it would provide complete food design freedom and thus rapid product innovation; would allow a highly efficient use of materials; and can eventually contribute to an increased consumer acceptance of alternative food materials (e.g. proteins from algae, among others) by turning them into well-structured and tasty food products.

The state-of-the-art for AM of food is very limited and has been mainly focused on Fused Deposition Modeling, which is based on extrusion techniques. However, this technique requires the material to be extrudate-able, which restricts the choice of materials that can be used.

Selective Laser Sintering (SLS) is a promising AM technique. SLS uses a high power laser to fuse small particles into a mass that has a 3-dimensional shape. The laser selectivity fuses powdered material by scanning cross-sections on the surface of a powder bed. After each cross-section is scanned, the powder bed is lowered by one layer thickness, a new layer of material is applied on top, and the process is repeated until the shape is completed.

SLS has widely been used for the manufacture of 3D shapes for industrial manufacturing such as metal or ceramic based 3D shapes that will otherwise not be possible to produce via traditional molding processes. For example, SLS has been used for the fabrication of porous medical devices, ceramic spare parts for high-tech industries, etc. However, SLS is practically unknown in food manufacturing.

The main hurdle in SLS technology applied to edible compositions is to find suitable powders, wherein individual powder particles can sinter together under the application of a laser without resulting in the decomposition of the material itself. Furthermore, it is desired that the sintering should lead to the formation of a consolidated, free standing 3D object with a high degree of design resolution. In addition, it is desirable to be able to construct diverse edible objects combining different materials.

SUMMARY OF THE INVENTION

In order to address one of more of the foregoing desires, the present invention provides, in one aspect, a method for the production of an edible object, comprising providing an edible powder composition suitable for selective laser sintering, wherein the edible powder composition comprises:
 a binder component having a melting or glass transition temperature in the range 10-200° C., and
 a structural component which is non-melting at the temperatures below 200° C.,
 and subjecting said composition to selective laser sintering to obtain the edible object.

In another aspect, the invention provides a food product comprising the edible object obtainable by the method of the invention. This food product has advantageously varying microstructures and thus textures and mouthfeel.

Previously, only sugar crystals were known to be processed using SLS, for example, by CandyFab. The product obtained is melted sugar with a low degree of design resolution. Such monocomponent printing can only be applied in limited ways in the printing of food.

The present invention is based on the judicious insight that a successful production of 3D edible objects can be achieved by using a powder composition comprising structural elements providing bulk and scaffold properties and powder particles that act as a binder providing actual particle-particle sintering, when an object is built. The end result is a mixture in which the binder helps consolidate the powder into the pre-defined three dimensional shape. Three-dimensional, or 3D, with respect to the edible objects obtained herein with SLS, means that the object contains more than 1 layer of the deposited material.

Accordingly, the formulation suitable for SLS and used in the present invention comprises a binder component and a structural component. Therefore, the invention provides a multi-material mixture for obtaining an edible object by SLS.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION OF THE INVENTION

Figure 1:
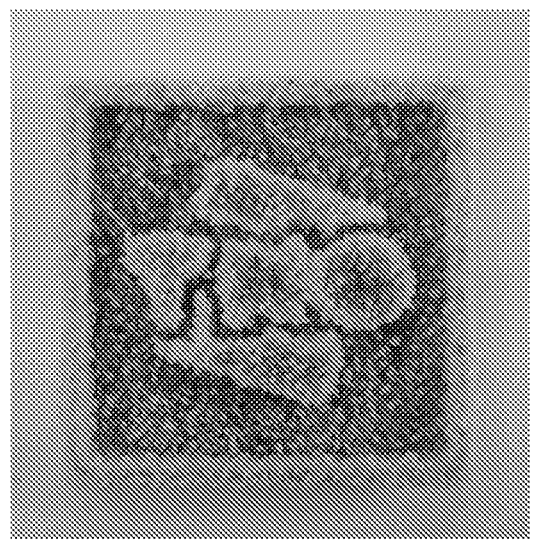
FIG. 1 is an obtained three-dimensional logo.

"Suitable for SLS" means here that the composition does not contain any ingredients that decompose while exposed to a laser at typical working temperatures and duration used in SLS. Typically, the temperature during SLS is in the range 100-200° C., more typically 140-180° C., and the application times—less than 1 sec, preferably less than 500 msec.

The edible powder composition is preferably a free-flowing powder. The term "free-flowing powder", as used herein, is well known to those skilled in the art and includes particulate materials that can be poured (e.g., from one vessel having an opening of from about 10 cm$^2$ to 50 cm$^2$ to another vessel of similar dimensions) without substantial clumping of the particles. In detail, the term "free-flowing" is used for a powdered material that is not sticky, and thus has no or hardly any tendency to agglomerate or to adhere to contact surfaces. The so-called angle of repose, $\theta_r$, is sometimes used as a measure for the flow properties of powders. The angle of repose is the angle that a cone of powder forms between a flat surface when it is poured onto that surface. Typically, for a free-flowing powder $\theta_r$ is low, e.g. smaller than 30°.

It is also preferred, yet not required, that the powder is monodisperse in order to give an even powder bed application and packing. An even powder bed layer is desirable since it influences the laser beam diffraction and ultimately, the sintering of the individual powder particles, thus resulting in a consolidated object from the individual particles. Sintering is defined here as a process where the melted material, either partially or fully melted, connects powder particles together upon cooling. Consolidation requires that the powder bed becomes bound together into the desired shape.

The structural component is a non-melting ingredient of the composition. Non-melting here means that the edible material withstands temperatures of up to 200° C. without decomposing or melting. "Non-melting at the temperatures below 200° C." means that the component is non melting at all the temperatures below 200° C., in other words, when the component is gradually heated up to 200° C., no melting takes place at any temperature below 200° C. In a broader sense, the structural component should preferably be non-melting at least under SLS conditions. The structural component serves to provide building blocks of the printed object. For this reason, it is preferable that the composition comprises at least 10 wt. % of the structural component, more preferably at least 30 wt. %, yet more preferable at least 40 wt. % or more. Generally, the composition comprises 10-90 wt. % of a structural component. Preferred compounds that can be used as the structural components are for example starch and semolina. Also a mixture of non-melting compounds can be used as a structural component. For example, powdered fruits, plants or vegetables such as cheakpeas, grains, beans are suitable.

The presence of a structural component, along with a binder, is essential. Although compositions containing only a binder may melt in the desired temperature range and be suitable for use in SLS, they do not allow to create consolidated 3D objects. For example, maltodextrin used alone for SLS is only able to form two-dimensional objects (a single layer) which show substantial warping (curling), that prevent the construction of further layers and thus creating a 3D object. In addition, these aforementioned examples also lead to fragile objects. Therefore, the presence of both a structural component and a binder is necessary for the construction of 3D objects by SLS.

The binder component is the melting ingredient of the composition. By melting, the binder provides a connection between the building blocks of the structural component thereby creating a continuous structure. To effectively act as a binder, the binder should have the melting temperature $T_m$ or the glass transition temperature $T_g$ in the range 10-200° C. and more preferably, the binder should undergo melting or glass transition under SLS conditions, that is at times less than 5 sec, more preferably less than 1 sec. Melting temperature (for crystalline compounds) and glass transition temperature (for non-crystalline compounds) can be determined by DSC. In the present description, the melt and glass transition temperatures are measured by DSC-Q200, TA Instruments made in New Castle, USA, using the heating rate 7.5° C./min.

The binder is preferably able to flow under the SLS conditions. This means that under the temperatures and within the short times used in the SLS, the binder is preferably able to become flowable. Flowable means here having a flowable consistency, and such flowable consistency can usually be directly observed. Flowable includes the states of compounds during melting and glass transition.

More preferably, the binder becomes substantially instantaneously flowable under SLS conditions (at 140-180° C. and in less than 1 sec). A good indication for this is a test wherein compounds are subjected to a high temperature for a short period of time and their behaviour with respect to flowability is observed. A similar test can be used to check which compounds would be suitable as the structural components that are non melting (and non degrading) under SLS conditions. Further, it is also desired that the binder is substantially instantaneously solidified after the laser is switched off or pass.

To ensure quick melting, it is particularly preferred that the binder is in an amorphous state. Amorphous binders usually flow and solidify quickly and may provide for the nearly instantaneous properties described in the preceding paragraph. An amorphous state is not understood here to exclude the presence of crystalline phases; partially amorphous is also covered here by the term "amorphous state". For multiple ingredients binder mixtures, it is preferred that at least one of the ingredients is in an amorphous state. The amorphous state can for example be obtained by subjecting a desired ingredient to a hot-melt process.

The binder is preferably selected from a group consisting of carbohydrates, carbohydrate derivatives, fats, oils, waxes, proteins and mixtures of these. Particularly suitable carbohydrates and carbohydrate derivatives are mono-, di-, oligo-, polysaccharides and sugar alcohols, more particularly glucose, sucrose, fructose, dextrins, polydextrose, maltodextrin, sorbitol, preferably polydextrose. Preferred polysaccharides have the dextrose equivalent (DE) of 2-20. Maltodextrins and glucose are especially preferred to be used as a binder. Also proteins can be used, preferably casein and albumin, among others. Fats, fatty acids, lipids or waxes may also be used, in an encapsulated or powdered form. Particularly preferred are plant-derived oils, such as palm oil, and other oils and fats used in baking, such as shortening.

The binder can contain a single ingredient or multiple ingredients. In case of a multiple ingredient binder, all the $T_m$ or $T_g$ of individual ingredients should lie in the range 10-200° C.

In a particularly preferred embodiment of the invention, the binder comprises at least two compounds that differ in their melting or glass transition temperatures. The melting or glass transition temperatures of the binder ingredients is determined by DSC, particularly by DSC-Q200, TA Instruments, New Castle USA. The heating rate used is 7.5° C./min. The various binder ingredients should have distinctive melting or glass transition temperature as determined by DSC at the above heating rate.

Preferably, the difference in the melting or glass transition temperatures of the binder ingredients should be at least 10° C., more preferably at least 20° C., most preferably in the range 30-50° C. Very good results are obtained, for example, with palm oil powder having a $T_g$ of 30° C., mixed with maltodextrin with a $T_g$ of 62° C. The melting or glass transition temperature of the lowest melting ingredient of the binder is preferably in the range 10-100° C., more preferably 30-90° C.

The above embodiment of a multiple ingredients binder system demonstrated excellent results during SLS with respect to the strength and design resolution of the produced 3D objects. Without wishing to be bound by theory, it is believed by the inventors that in such a system, the lowest melting ingredient helps to increase heat transfer from the laser into the higher melting ingredients of the binder system. The melt pool of the lowest melting ingredient allows for more of the other binders to be heated, thus resulting in an increased area of sintered material and hence stronger objects. In addition, upon cooling and thus solidification of the binder ingredients with higher melting points those are plasticized by the binder ingredient with a lower melting point, which minimizes warping effects. This is believed to contribute to the excellent consolidation and high design resolution properties of the final 3D product.

The binder is preferably present in an amount of 10-90 wt. % based on the total weight of the composition. More preferably, the binder is present in an amount of at least 20 wt. %, yet more preferably at least 40 wt. %. It is also possible to define the amount of the binder present relative to the structural component. In such case, the weight ratio of the structural component to the binder is preferably from 10:90 to 90:10. When multiple ingredient binder systems are used, it is preferred to have at least 5 wt. %, more preferably at least 10 wt. %, of the lowest melting ingredient, based on the weight of the binder system.

Apart from the above-mentioned ingredients, the composition may comprise other ingredients that do not influence the melting behaviour of the binder and do not decompose or form undesired reaction products at heating. For example, emulsifiers, antioxidants, flavouring agents, free flowing agents and colouring agents may be used. In addition, ingredients to modulate microstructures and thus textures may also be added.

Further, water can be present in the powder or added to the powder during the method of the invention. Preferably, water is added to the powder bed system as a mist in the SLS chamber or as powdered ice under cryogenic conditions during the method of the invention. The water maybe be added as a mist from 0 to 10 wt. %. In the form of powdered ice, water can be added from 0 to 50 wt. %, preferably under cryogenic mixing. The water content is based on the powder composition weight.

In the present invention use is made of the SLS technology. Any suitable SLS set-up can be used. For example, traditional infra-red CO2 lasers can be used, but also diode lasers.

The invention further provides, in another aspect, a food product comprising the edible object obtainable according to the present invention. Particularly, the food product is preferably a bakery product, a dry mix for beverage or an instant soup, or a confectionery product. Suitable food products include, for example, biscuits, cookies, snack bars, dry mixes for reconstitutable beverage products such as fruit juices and soups.

With the present invention, it is now possible to print food grade products using SLS. In addition, multi-material food products can be produced. Yet another advantage of the invention is that free-form three-dimensional printed food products can be obtained with a high degree of design resolution and solid consolidation.

The following non-limiting examples illustrate the invention and do not limit its scope in any way. In the examples and throughout this specification, all percentages, parts and ratios are by weight unless indicated otherwise.

EXAMPLES

The SLS procedure was performed using EOS P380 (from 3T RPD Ltd, UK), with a carbon dioxide laser, laser spot diameter 0.6 mm. If not mentioned otherwise, the laser settings used were: line distance of 0.1 mm, writing speed 1250 mm/sec, laser power 50%, layer thickness 0.3 mm.

The design resolution and consolidation degree was evaluated by visual examination of sintering between powders particles and between the different powder layers applied. Furthermore, differential scanning calorimetry (DSC) measurements were carried out in order to determine the melting points and glass transition temperatures of the various ingredients. The percentages indicated through the whole text are percentages by weight, unless otherwise indicated.

Example 1

Comparative

In the following experiments, the compositions for SLS contained only a structural component and no binder.

As the structural component, the compositions contained either native wheat starch or semolina. SLS was used to create a square object (layer) and a 3D logo of several layers. As a result, thin, fragile sheets can be obtained. With the 3D logo composed of several layers, the design resolution was poor.

Example 2

Comparative

In this experiment, only a binder, being maltodextrin (Maltodextrin 6 or maltodextrin 29) was used and no structural component.

It was possible to create square objects of 1 or 2 layers. The obtained objects were strong. However, while attempting to deposit more layers, the objects started to curl, which made it impossible to create thicker objects.

Example 3

In this experiment a series of mixtures was investigated, comprising 90% starch as the structural component and 10% of a single ingredient binder, chosen from glucose, de-amidated gluten, maltodextrin 10 (MD 10), gelatine, whey protein and soy protein.

From these mixtures simple objects such as squares were made. Since dry materials were used, no drying step was needed. Cooling down of the laser heated objects occurred in the SLS setup under ambient conditions.

It was observed that the compositions with either glucose or MD 10 as a binder resulted in the formation of objects that were stronger (more consolidated) than those composed of pure starch. In contrast, the use of de-amidated gluten, gelatine, whey protein, or soy protein as a binder did not result in the formation of stronger objects, when compared to the pure starch objects.

It was observed that many of the objects warped, especially when building multilayer objects. In most cases, warping started with the addition of the second layer.

Example 4

In this example, the compositions imitate a recipe for a dry (or "short") cookie dough mixture. All the compositions comprised 50% semolina as the structural component and 50% of a binary ingredients binder. As the binder, the following mixtures were used:
(1) 180 g polydextrose and 20 g palm oil powder,
(2) 180 g polydextrose and 20 g sorbitol,
(3) 180 g sucrose and 20 g stearic acid, (4) 180 g sucrose and 20 g sorbitol,
(5) 180 g glucose and 20 g palm oil powder,
(6) 180 g glucose and 20 g sorbitol,
(7) 180 g maltodextrin 29 and 20 g palm oil powder,
(8) 180 g maltodextrin 29 and 20 g sorbitol.

Also a composition with 50% wheat starch +50% binder was used, wherein the binder was:
(9) 180 g polydextrose and 20 g palm oil powder.

The compositions were used to produce 1-layer square objects. All of the 9 tested mixtures resulted in the formation of strong, fully consolidated objects (squares). No big differences in strength could be observed among the various recipes. No curling of the sheets occurred.

Example 5

In this example, one specific composition from the previous example was used to create complex three-dimensional forms such as a three-dimensional logo and a hollow cube (1.5×1.5×1.5 cm).

The composition contained 50% semolina+50% binder, wherein the binder was a mixture of 180 g polydextrose and 20 g palm oil powder.

Figure 2:
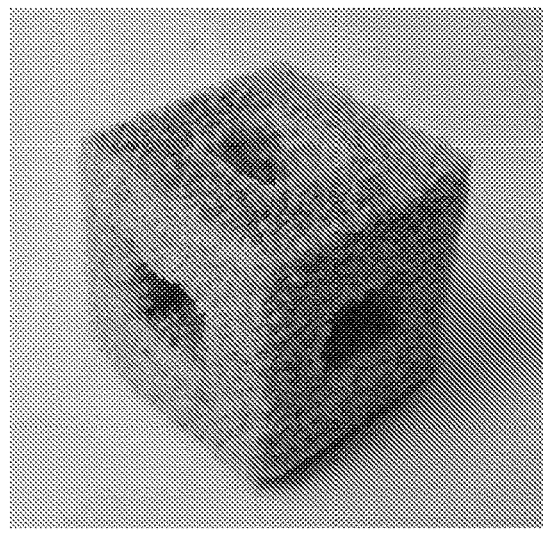
FIG. 2 is the obtained hollow cube.
Figure 2:
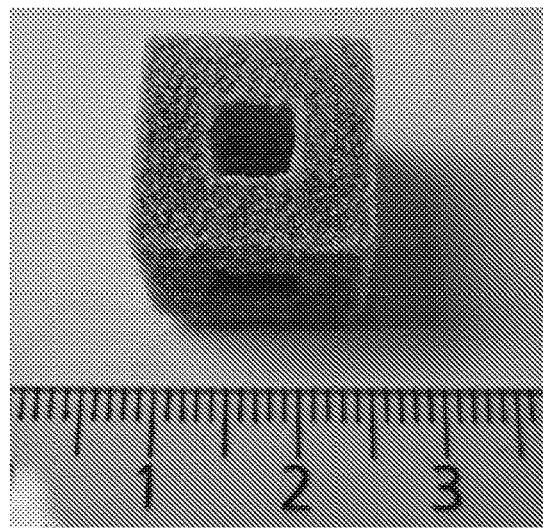

The laser settings for the logo included laser power of 60%, the layer thickness of 0.3 mm and 5× square layers and 5× layers with the "TNO" logo. For the hollow cube, the settings included 50% laser power and 50 layers of 0.3 mm. The remaining loose powder was carefully blown away. The obtained objects were strong. FIG. 1 shows the obtained three-dimensional logo and FIG. 2 shows the obtained hollow cube.

These results clearly demonstrate that SLS can be used to make shapes of a range of food materials, and that complex 3D shapes are possible.

Example 6

In this example the above used cookie-type recipe was adapted into mixtures comprising fruit powders or legume powders. Both mixtures were developed with the intent of yielding 3D products that can be dissolved in water to obtain, respectively, an instant fruit beverage or soup.

Fruit Powder Formulation (Strawberry Type)

| 25% Paselli SA2 | structural element solubilizable in cold water |
| 40% fruit powder | main flavour ingredient, behaves as binder (highly hydroscopic) |
| 30% polydextrose | binder |
| 5% palm oil | binder, acts as plasticizer |

Legume Powder Formulation (Chickpea Type)

| 50% legume powder | structural element |
| 30% MD (DE 28) | binder |
| 20% palm oil | binder |

In the case of the fruit powder a mixture was formulated that was transformed into squares and a 3D logo of several layers, however due to the extreme hygroscopicity of the fruit powder, humidity control was necessary.

The legume powder formulation was used to obtain squares. The formulation did not have problems due to hygroscopicity, however, the experiments resulted in brittle shapes.

Example 7

To create different textures, samples were prepared using different binders and structural components at different ratios.

The powder is placed by hand on the SLS platform. Using a brush the powder is spread to a uniform thickness. To create an additional layer powder is applied by hand on top of the previous layer using a sieve. The powder bed is lowered and a brush spreads the layer to a uniform thickness. The shapes that were made by SLS were filled 40×20 cm rectangles. Laser setting included laser power of 50%, layer thickness of 0.3 mm and number of layers 7. Two samples were produced in every batch, three batched every powder composition, in total 6 samples.

The compositions used are presented in the following table. The amounts are indicated in parts by weight.

| | Structural component | Binder | Ratio |
|---|---|---|---|
| A1 | Semolina | Polydextrose:Palm oil powder (90:10) | 50:50 |
| A2 | Semolina | Sorbitol:Palm oil powder (90:10) | 50:50 |
| A3 | Semolina milled | Polydextrose:Palm oil powder (90:10) | 50:50 |
| A4 | Soft wheat starch | Polydextrose:Palm oil powder (90:10) | 50:50 |
| A5 | Soft wheat flour:Wheat starch purified (50:50) | Polydextrose:Palm oil powder (90:10) | 50:50 |
| A6 | Soft wheat starch | Sucrose:Palm oil powder (90:10) | 50:50 |
| A7 | Soft wheat starch | Polydextrose:Palm oil powder (60:40) | 50:50 |
| A8 | Soft wheat starch | Polydextrose:Palm oil powder (90:10) | 40:60 |
| A9 | Soft wheat starch | Polydextrose:Palm oil powder (90:10) | 60:40 |

Figure 3:
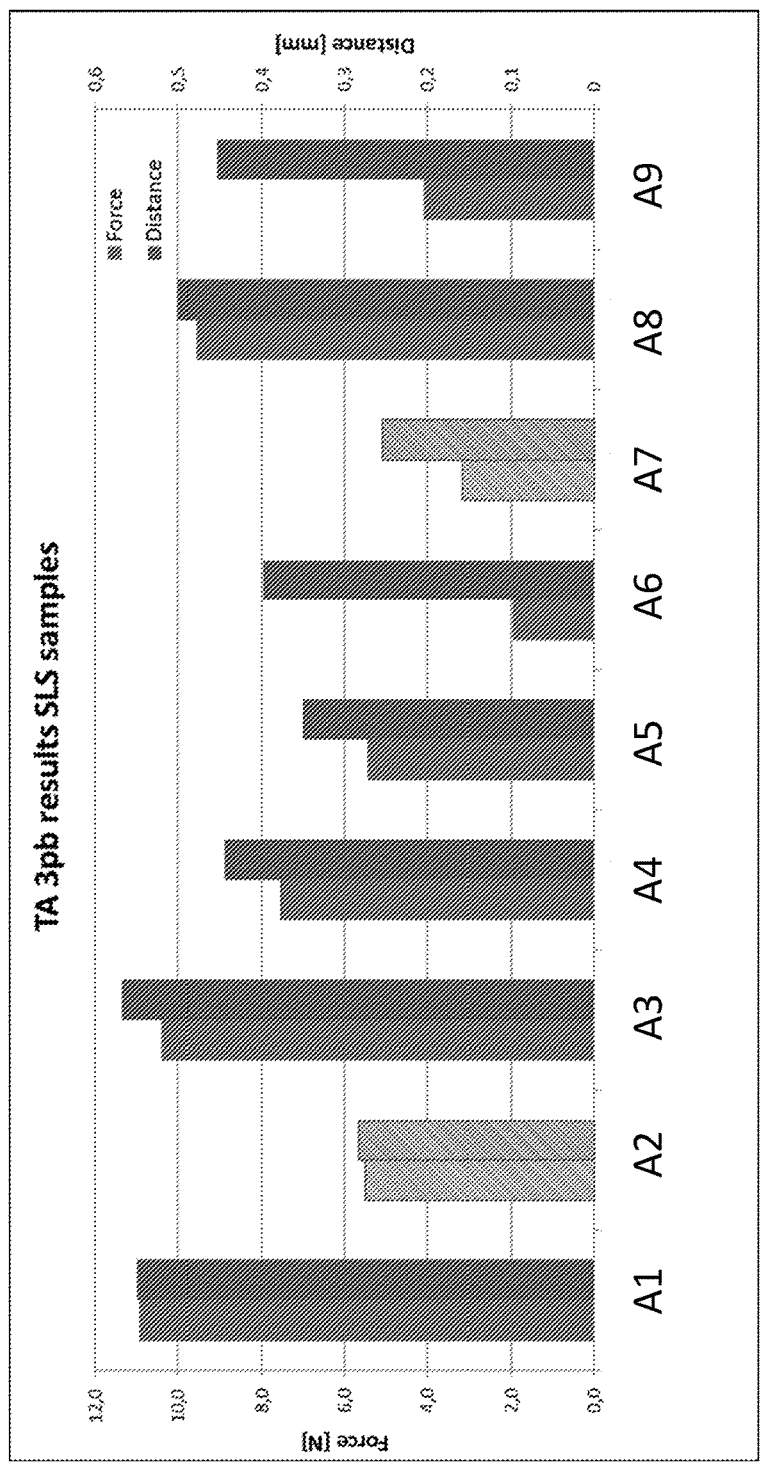
FIG. 3 is a table combining the results of a varied force and a varied distance for each composition A1-A9.

The texture of the samples were analyzed using texture analyzer TA-TX3 Stable Micro Systems Ltd, the probe used: A/3PB three point bending rig. The force is measured when the sample breaks. The instrument also measures the depth at which the break occurred. The measurements were carried out in two conditions—at a fixed penetration distance, or at a fixed force. The results of the measurements are presented in FIG. 3, as average for every sample. This figure combines the results of a varied force (left columns) and of a varied distance (right columns) for each composition sample A1-A9.

The results show that it is possible to create a variety of textures by varying the binders, structural components and their ratios. This variety of textures is not achieved with monocomponent printing, e.g. CandyFab.

The invention claimed is:

1. Method for the production of an edible object, comprising providing an edible powder composition suitable for selective laser sintering, wherein the edible powder composition comprises a binder component having a melting or glass transition temperature in the range 10-200° C., and a structural component which is non-melting at the temperatures below 200° C., and subjecting said composition to selective laser sintering to obtain the edible object;
wherein said selective laser sintering involves providing said edible powder composition as a powder bed, and selectively fusing said powder composition with a laser by scanning with said laser cross-sections on the surface of the powder bed; and
wherein said binder is present as a powder in said powder bed before said selectively fusing.

2. The method according to claim 1, wherein the binder becomes flowable under the selective laser sintering conditions.

3. The method according to claim 1, wherein the binder comprises at least two compounds that differ in their melting or glass transition temperatures.

4. The method according to claim 3, wherein the difference in the melting or glass transition temperatures of the binder ingredients are at least 10° C.

5. The method according to claim 3, wherein the binder comprises at least 5 wt. % of the compound with the lowest melting or glass transition temperature, based on the weight of the binder.

6. The method according to claim 3, wherein the compound with the lowest melting or glass transition temperature has the melting or glass transition temperature in the range 10-100° C.

7. The method according to claim 1, wherein the edible powder composition is a free-flowing powder.

8. The method according to claim1, wherein the composition comprises at least 10 wt. % of the structural component based on the total weight of the composition.

9. The method according to claim 1, wherein the structural component comprises starch or semolina.

10. The method according to claim 1, wherein the binder is in an amorphous state.

11. The method according to claim 1, wherein the binder is selected from a group consisting of carbohydrates, carbohydrate derivatives, fats, oils, waxes, proteins and mixtures of these.

12. The method according to claim 11, wherein the carbohydrates or carbohydrate derivatives are selected from mono-, di-, oligo-, polysaccharides and sugar alcohols.

13. The method according to claim 1, wherein the binder is present in an amount of 10-90 wt. % based on the total weight of the composition.

14. The method according to claim 1, wherein water is present in the SLS chamber either as a mist or as powdered ice.

15. A food product comprising the edible object obtainable by the method according to claim 1.

16. The food product according to claim 15, being a bakery product, a dry mix for beverage, an instant soup or a confectionary product.

* * * * *